(12) United States Patent
Znamenskiy et al.

(10) Patent No.: US 9,982,995 B2
(45) Date of Patent: May 29, 2018

(54) 3D SCANNER USING STRUCTURED LIGHTING

(75) Inventors: Dmitry Nikolayevich Znamenskiy, Eindhoven (NL); Ruud Vlutters, Eindhoven (NL); Karl Catharina Van Bree, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 619 days.

(21) Appl. No.: 14/117,446

(22) PCT Filed: May 11, 2012

(86) PCT No.: PCT/IB2012/052347
§ 371 (c)(1),
(2), (4) Date: Nov. 13, 2013

(87) PCT Pub. No.: WO2012/160470
PCT Pub. Date: Nov. 29, 2012

(65) Prior Publication Data
US 2015/0204663 A1 Jul. 23, 2015

(30) Foreign Application Priority Data
May 24, 2011 (EP) .................................. 11167285

(51) Int. Cl.
*G06K 9/00* (2006.01)
*H04N 13/00* (2018.01)
(Continued)

(52) U.S. Cl.
CPC ...... *G01B 11/2518* (2013.01); *G01B 11/2513* (2013.01); *G01B 11/2536* (2013.01);
(Continued)

(58) Field of Classification Search
CPC ............................ G01B 11/2513; G01B 11/25
See application file for complete search history.

(56) References Cited

U.S. PATENT DOCUMENTS 6,510,244 B2 * 1/2003 Proesmans ......... G01B 11/2513
345/419
6,549,288 B1 * 4/2003 Migdal .................. G01B 11/25
356/601

(Continued)

FOREIGN PATENT DOCUMENTS

CN 1654923 A 8/2005
CN 201440274 U 4/2010
(Continued)

OTHER PUBLICATIONS

S. Gumhold et al., "Image-Based Motion Compensation for Structured Light Scanning of Dynamic Surfaces", Visual Computing—Convergence of Computer Graphics and Computer Vision, 2008, pp. 1-4.

(Continued)

*Primary Examiner* — Rebecca Volentine
(74) *Attorney, Agent, or Firm* — Michael W. Haas

(57) ABSTRACT

A series of structured lighting patterns are projected on an object. Each successive structured lighting pattern has a first and second subset of intensity features such as edges between light and dark areas. The intensity features of the first set coincide spatially with intensity features from either the first or second subset from a preceding structured lighting pattern in the series. Image positions are detected where the intensity features of the first and second subset of the structured lighting patterns are visible in the images. Image positions where the intensity features of the first subset are visible are associated with the intensity features of the first subset, based on the associated intensity features of closest detected image positions with associated intensity features in the image obtained with a preceding structured lighting pattern in said series. Image positions where the intensity features of the second subset are visible, between pairs of the image positions associated with intensity fea- (Continued)

tures of the first subset, with intensity features of the second subset between the intensity features associated with the pair of positions. The associated intensity features in a final structured lighting pattern of the series are used to identify the intensity features of the final structured lighting pattern for the determination of 3D surface position information.

14 Claims, 2 Drawing Sheets

(51) Int. Cl.
  *G01B 11/25* (2006.01)
  *G06T 7/521* (2017.01)
  *G06T 7/586* (2017.01)
(52) U.S. Cl.
  CPC .............. *G06T 7/521* (2017.01); *G06T 7/586* (2017.01); *G06T 2207/10012* (2013.01); *G06T 2207/10028* (2013.01); *G06T 2207/10152* (2013.01)

(56) References Cited

U.S. PATENT DOCUMENTS

| | | | | |
|---|---|---|---|---|
| 6,754,370 | B1* | 6/2004 | Hall-Holt | G01B 11/25 356/3 |
| 7,315,241 | B1 | 1/2008 | Daily et al. | |
| 7,440,590 | B1* | 10/2008 | Hassebrook | G01B 11/2513 345/582 |
| 7,724,379 | B2* | 5/2010 | Kawasaki | G01B 11/2509 356/603 |
| 8,724,121 | B2* | 5/2014 | Lee | G01B 11/2513 356/604 |
| 8,970,693 | B1* | 3/2015 | Chang | G06T 19/006 348/136 |
| 2002/0164066 | A1* | 11/2002 | Matsumoto | G06T 17/10 382/154 |
| 2003/0002724 | A1 | 1/2003 | Befu et al. | |
| 2006/0210145 | A1* | 9/2006 | Lee | G01B 11/2513 382/154 |
| 2006/0210146 | A1* | 9/2006 | Gu | G01B 11/25 382/154 |
| 2007/0057946 | A1* | 3/2007 | Albeck | G01B 11/2513 345/427 |
| 2009/0141287 | A1* | 6/2009 | Sato | G01B 11/2536 356/610 |
| 2009/0238449 | A1* | 9/2009 | Zhang | G06T 7/521 382/165 |
| 2010/0079581 | A1 | 4/2010 | Russell et al. | |
| 2010/0081094 | A1 | 4/2010 | Hasebe et al. | |
| 2010/0182311 | A1 | 7/2010 | Kim | |
| 2010/0189342 | A1 | 7/2010 | Parr et al. | |
| 2010/0194855 | A1* | 8/2010 | Mamiya | G01B 11/25 348/42 |
| 2010/0253677 | A1 | 10/2010 | Kroll et al. | |
| 2012/0176478 | A1* | 7/2012 | Wang | G01B 11/2536 348/47 |
| 2012/0237112 | A1* | 9/2012 | Veeraraghavan | G06T 7/0057 382/154 |

FOREIGN PATENT DOCUMENTS

| | | |
|---|---|---|
| CN | 102042814 A | 5/2011 |
| EP | 2169627 A2 | 3/2010 |
| JP | 2006010576 A | 1/2006 |
| WO | 02095680 A1 | 11/2002 |
| WO | WO2010081094 A2 | 7/2010 |
| WO | WO2011013373 | 2/2011 |

OTHER PUBLICATIONS

O. Hall-Holt et al., "Stripe Boundary Codes for Real-Time Structured-Light Range Scanning of Moving Objects", Proceedings of the Eight IEEE International Conference on Computer Vision (ICCV), Vancouver, BC, Canada, Jul. 7-14, 2001, International Conference on Computer Vision, Lost Alamitos, CA: IEEE Comp. Soc., US., vol. 2, Jul. 7, 2001, pp. 359-366.
Sato, "Range Imaging Based on Moving Pattern Light and Spatio-Temporal Matched Filter", IEEE Image Processing, vol. 1, 1996, pp. 33-36.
Salvi et al, "Pattern Codification Strategies in Structured Light Systems", The Journal of the Pattern Recognition Society 37, 2004, pp. 827-849.
Konig et al, "Image-Based Motion Compensation for Structured Light Scanning of Dynamic Surfaces", Dynamic 3D Imaging (Workshop in Conjuction With DAGM'07), 2007, pp. 173-181.
Weise et al, "Fast 3D Scanning With Automatic Motion Compensation", 2007 IEEE Conference on Computer Vision and Pattern Recognition (Jun. 2007), pp. 1-8.
Verghese et al, "Real-Time Motion Tracking of Three-Dimensional Objects", IEEE International Conference on Robitics and Automation, vol. 3, 1990, pp. 1998-2003.
Chi-Wing et al, "Binary-Space-Partitioned Images for Resolving Image-Based Visibility", IEEE Transactions on Visiusalization and Computer Graphics, vol. 10, No. 1, 2004, pp. 58-71.

\* cited by examiner

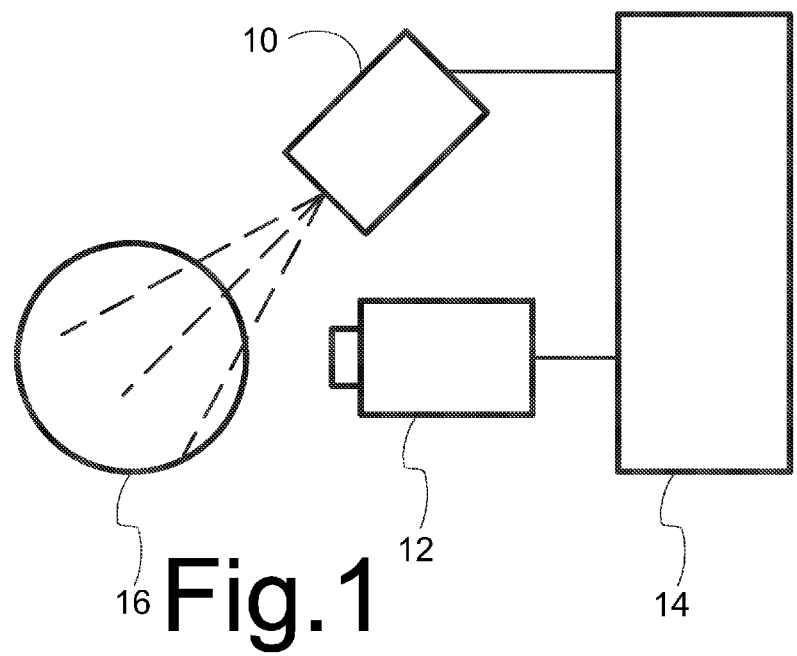
Fig.1
Fig.3
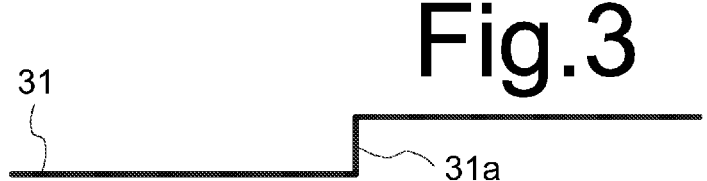
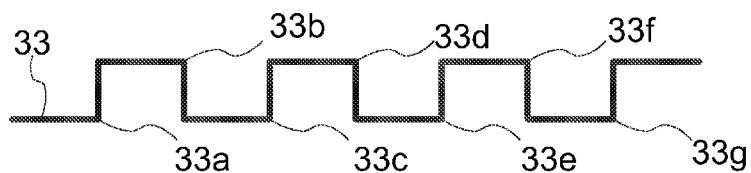

US 9,982,995 B2

3D SCANNER USING STRUCTURED LIGHTING

CROSS-REFERENCE TO PRIOR APPLICATIONS

This application is the U.S. National Phase application under 35 U.S.C. § 371 of International Application Serial No. PCT/IB2012/052347, filed on May 11, 2012, which claims the benefit of European Application Serial No. 11167285.3, filed on May 24, 2011. These applications are hereby incorporated by reference herein.

FIELD OF THE INVENTION

The invention relates to a method and system for determining 3D information using structured lighting.

BACKGROUND OF THE INVENTION

Structured lighting is a well known technique for use in extraction of 3D information from a scene. The extraction of 3D information is based on the projection of a known lighting pattern on a scene, and capturing of the resulting image with a camera of the scene. The technique works on the basis of disparity (as when a stereo-camera is used), with a distance (often called the baseline) between the camera and a projector that projects the lighting pattern. As a result of this disparity, one can determine the depth of an object (seen from the camera). Similar to a stereo-camera, such a system can estimate depth, but as we project lighting structures (patterns), the system also works on uniform objects, which is not the case for a stereo camera. Therefore, structured light systems provide much more reliable depth estimation than stereo vision systems.

A key step in 3D information extraction is the determination where features of the lighting pattern are projected on the object by the projector. This is sometimes called "decoding. A decoding technique is described in an article by Gumholdt et al in an article titled "Image-based motion compensation for structured light scanning of dynamic surfaces" (IJISTA(2008) 434-441). In this technique a plurality of different structured lighting patterns is used successively, the time dependence of the pixel intensity being used to identify the plane from the projector that intersects the object at the pixel. In its simplest form, this technique assumes that the object does not move. If object movement cannot be excluded, motion compensation according to a motion vector is used to map an object point to the same pixel in a series of images. Gumholdt mentions that detection of motion of stripes from the structured lighting pattern can be used to determine the required motion vector, but Gumholdt prefers a more robust technique, wherein special reference lighting patterns are used to obtain images that can be correlated to determine the motion vectors. However, these techniques are still not completely robust.

SUMMARY OF THE INVENTION

Among others it is an object to provide for a more robust method and system for determining 3D surface position information from a 2D image of a scene obtained with structured lighting.

A method of determining 3D surface position information according to claim 1 is provided. Herein a series of structured lighting patterns with intensity features such as edges between areas of mutually different intensity is used.

Different ones of the structured lighting patterns from the series are used to illuminate an object at different time points and resulting images of the object are used to detect the positions where the intensity features are visible in the image. A first and second subset of the intensity features are distinguished to determine which detected position corresponds to which intensity feature in the structured lighting pattern. In the example wherein the intensity features are edges, the features of the first set may be edges where the intensity along a path through the image rises to the intensity level of high intensity areas and the features of the second subset may be edges along the path where the intensity drops from high intensity areas for example.

In the series of structured lighting patterns, first subset of the intensity features of each successive image coincide spatially with the features (from the first and second subset) of a preceding structured lighting pattern in the series. Compared to the preceding structured lighting pattern, the intensity features of the second subset are added features, located between the intensity features of the first subset and/or beyond the outermost intensity features of the preceding structured lighting pattern. Thus, the positions of the intensity features of the structured lighting patterns in the series lie successively more dense.

Intensity features of the first subset are identified with detected positions of the intensity features of the first subset, based on the identification of detected intensity features obtained with a preceding structured lighting pattern in the series. Intensity features of the second subset that lie between pairs of positions of the intensity features of the first subset are identified with detected positions between the detected positions of intensity features of the pair. In this way the risk of miss-identification is minimized.

Associated image positions of intensity features of the first subset for the image obtained with the current structured lighting pattern may be determined before or after the associated image positions of intensity features of the first subset. In one embodiment, the associated positions for the second subset are determined first, from image position ranges selected on the basis of associated image positions of image intensity features of the first subset for the image obtained with the preceding structured lighting pattern. In this embodiment the associated positions for the first subset are determined next, from image position ranges selected on the basis of associated image positions of image intensity features of the second subset for the image obtained with the current structured lighting pattern. In this way the second intensity features provide for a form of motion compensation that reduces the risk or identification errors. In another embodiment, the associated positions for the first subset are determined first, based on the associated image positions of image intensity features of the first subset for the image obtained with the preceding structured lighting pattern. The image positions closest to the associated positions for the image obtained with the previous structured lighting pattern may be selected for example. In this embodiment the associated positions for the second subset may be determined next, from image position ranges selected on the basis of associated image positions of image intensity features of the first subset for the image obtained with the current structured lighting pattern.

In an embodiment, the object is illuminated with the structured lighting patterns in a temporal sequence corresponding to their sequence in the series, that is, in time in the sequence in which they occur in the series, or in the reverse of that sequence. In this way, motion between capture of images that are used to identify the intensity features of the first subset is minimized.

In an embodiment, the illumination with at least one of the structured lighting patterns in the series comprises successive illumination with a pair of complementary lighting patterns, i.e. wherein one pattern in the pair is dark at locations where the other is white and vice versa. In this embodiment, a pair of images may be captured when the object is lighted with the complementary lighting patterns and the resulting image for position detection may be a difference image between the images of the pair.

In an embodiment, the positions in the image where the intensity features are visible are detected from the intensity profile along an image line. This may be repeated for a plurality of image lines. In this way, the positions of the intensity profiles can be detected with a minimum of computation. In an embodiment, the intensity features of the first and second subset are intensity edges in mutually opposite directions of intensity change along an image line. In this way, it is easy to detect whether an intensity feature belongs to the first subset or to the second subset.

In an embodiment a plurality of preceding structured lighting patterns may be used to identify detected positions of the intensity features of the first subset. Thus, if no suitable position is found that is obtained with the immediately preceding structured lighting pattern, the position from a further distant preceding structured lighting pattern may be used. In this way, the method is more robust against invisibility of features in some of the images.

The identification of the positions with intensity features of the structured lighting pattern are used to determine 3D positions of points on the object where the intensity features are visible. This may be done directly, using the image positions of features obtained with the final structured lighting pattern to compute the 3D positions, or indirectly, using intensity features of a further structured lighting pattern for the computation the 3D positions. In the latter case the intensity features of the further lighting pattern may be identified by means of a dense set of positions of identified intensity features in the final structured lighting pattern to compute the 3D positions.

The steps of the method may be performed under control of a computer program run by a programmable processing system. According to one aspect, a computer program product such as a disk or a semi-conductor memory with such a program is provided.

According to an aspect a 3D object scanner according to claim 11 is provided.

BRIEF DESCRIPTION OF THE DRAWING

These and other objects and advantageous aspects will become apparent from a description of exemplary embodiments, using the following figure.

FIG. 1 shows a system for determining 3D surface position information

FIG. 3 illustrates image signal values along an image line

DETAILED DESCRIPTION OF EXEMPLARY EMBODIMENTS

Figure 2:
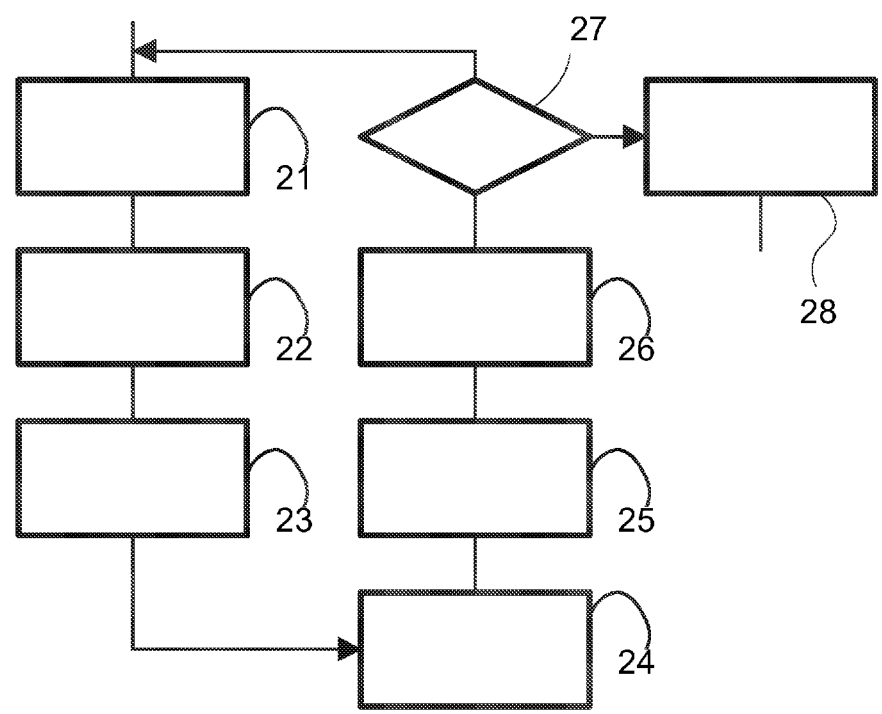
FIG. 2 shows a flow chart of 3D surface position determination

FIG. 1 shows a system for determining 3D surface position information, comprising a light source 10, a camera 12, and a processing system 14 coupled to light source 10 and camera 12. Light source 10 and camera 12 are both directed at an object 16 from different positions.

In operation, light source 10 projects a series of lighting patterns P(n) (n=0, 1, . . . ) onto object 16 and camera 12 captures images IM(n) of object 16 when object 16 is illuminated by the respective patterns. In the following, lighting patterns P(n) will be characterized by intensities in their cross-section with a plane transverse to rays from light source 10 (as used herein, "transverse" is used for not parallel to, for example perpendicular to). The three dimensional structure of the lighting pattern follows from this cross-section and the properties of light source 10. For example, in the case of a divergent light source, the lighting pattern comprises a collection of light rays in a continuum of directions from a source point. Each point in the cross-section corresponds to one of these direction and the intensities in the cross-section correspond to the intensities of the light rays in the corresponding directions. In the case of a parallel beam light the intensities in the cross-section correspond to the intensities of parallel light rays that each pass through a corresponding point in the cross-section.

An embodiment will be described wherein the lighting patterns have cross-sections with light and dark areas. In this case, the lighting patterns will be characterized in terms of edges between the light and dark areas.

FIG. 2 shows a flow-chart of an embodiment of operation of 3D surface position determination under control of processing system 14. In a first step 21, processing system 14 selects a current lighting pattern. Initially, processing system 14 selects a current lighting pattern P(n) (with initially n=0) that has a cross-section with just one straight edge between a light area and a dark area. In a second step 22, processing system 14 controls light source 10 to project the current lighting pattern onto object 16. In an embodiment successive illumination with a pair of complementary images may be used.

In a third step 23, processing system 14 captures an image IM(n) (with initially n=0) of object 16 from camera 12, obtained while object 16 is illuminated with the current lighting pattern. Optionally, the image IM(i) may be a difference image IM1($n$)-IM0($n$) with pixel values that are differences between pixel values of an image IM1 obtained while object 16 is illuminated with the current lighting pattern P(n) and an image captured without such lighting, or with a complement P'(n) of such a lighting pattern (e.g. so that the sum of the intensities in the cross section of the lighting patterns P(n), P'(n) is position independent). In this embodiment processing system 14 is configured to control light source 10 to switch off illumination, or switch to the complementary pattern and to capture an image IM1($n$) and IM0($n$) successively with and without the lighting pattern P(n) or with the lighting pattern P(n) and its complement P'(n). Optionally the image IM(n) may be obtained by binarizing an intensity value image or difference image, for example by comparing intensity values with a threshold. If illumination with the pattern is followed by illumination with the complementary pattern, the edge positions correspond to sign changes in the difference image. In a fourth step 24, processing system 14 scans the captured image IM(n) along a number of parallel image lines that run transverse to the direction along the edge, searching the image intensity along the line for a step or sign change that corresponds to the edge and determining the position x(i) of that step or sign change (the index i labeling transitions along the image line: ideally for the initial image IM(0) there is only one image line edge and i=0).

In fifth step 25 and sixth step 26, processing system 14 associates the image line edges with lighting pattern edges in the cross-sections of the current lighting pattern P(n). In seventh step 27, processing system 14 tests whether the preceding steps have been executed for a predetermined number of lighting patterns. If not, processing system 14 repeats from first step 21 with a new lighting pattern.

Thus, processing system 14 executes successive cycles of first to seventh step 21-27, each with a different lighting pattern P(n) as current lighting pattern. The lighting pattern P(n) in each successive cycle has a first subset of mutually parallel lighting pattern edges at the same positions as edges in the lighting pattern P(n−1) in the previous cycle, plus a second subset of lighting pattern edges between each two successive lighting pattern edges in the first subset, parallel to those two successive lighting pattern edges. Optionally, the second subset may contain lighting pattern edges beyond the outermost lighting pattern edges of the first subset.

FIG. 3 illustrates the lighting patterns in terms of idealized image intensity along a same image line in successive images obtained with successive lighting patterns, as processing system 14 may encounter in fourth step 24 when object 16 remains fixed.

The first image intensity profile 31 along the image line corresponds to an initial lighting pattern and has one image line edge 31a. Successive intensity profiles 32, 33 (only two shown) of the image line in successive cycles have successively more image line edges 32a-c, 33a-g etc. The first and second subsets of image line edges can be distinguished in the second intensity profile 32: a first subset with one image line edge 32b at the same location to the image line edge 31a of the first intensity profile 31 and a second subset with two image line edges 32a,c on respective sides of the image line edge 31a in the first subset. Similarly, two subsets of image line edges can be distinguished in the third intensity profile 33: a first subset with image line edges 33b, d, f that correspond to the image line edges 32a, b, c of the second intensity profile 32 and a second subset with image line edges 33c,e between the image line edges 33b, d, f of the first subset and image line edges 33a,g on respective sides of the image line edges 32a,c in the first subset. As may be noted all image line edges in the first subset have the same first polarity (low to high intensity), and all image line edges in the second subset have a same second polarity (high to low intensity), opposite to the first polarity.

In fifth step 25 and sixth step 26, processing system 14 associates image line edges form the image IM(n) with lighting pattern edges in the cross-sections of the current lighting pattern P(n). The association may be represented by recording the detected image line edge positions X(i) (the index i labeling transitions along the image line) in combination with a label L(i) of an lighting pattern edge. However, image line edges or other image features may be associated with features of the lighting patterns in any convenient way, for example by storing the position value X(i) in a table with entries for different features of the lighting pattern, using a table with entries corresponding to each of the respective pixel position along the line and storing the label L(i) of a feature in the entry for the pixel position X=X(i), using a table with entries corresponding to each respective edge position and storing the label L(i) of a feature in the entry for the edge position X(i), storing a set of pairs (X(i), L(i)), each of a position and a label etc. The labels may be indexes of lighting features in a predetermined sequence of features, or pointers to data blocks with information about the features etc.

In fifth step 25, processing system 14 determines the associated lighting pattern edges L(i) for image line edges with the first polarity (the first subset of edges). For the initial lighting pattern fifth step 25 may be skipped. In sixth step 26, processing system 14 determines the associated lighting pattern edges L(i) for image line edges with the second polarity (the second subset of edges).

In fifth step 25, processing system 14 uses the associated lighting pattern edges L(i) of image lines from one or more images IM(n−1), IM(n−2) . . . obtained with one or more previous lighting patterns P(n−1), P(n−2) . . . to determine associated lighting pattern edges of the of the image line from the image IM(n) obtained with the current lighting pattern P(n).

If it can be assumed that all lighting pattern edges in the lighting patterns P(n) correspond to image line edges at positions x(i) along the image line and vice versa, processing system 14 may perform fifth step 25 by determining for each image line edge from the image IM(n−1) obtained with the previous lighting pattern P(n−1) the position x(i) of the closest image line edge of the first polarity in the current image IM(n) obtained with current lighting pattern P(n). In a further embodiment motion estimated for the edges of the first polarity determined for a preceding structured lighting pattern may be used to adjust the image positions before searching for the closest edge. The motion may be estimated from the image positions of corresponding edges from a series of preceding structured lighting patterns (using the relevant edge, and/or one or more edges in its surroundings). Processing system 14 may copy the associated lighting pattern edge L(i') of the image line edge from the image IM(n−1) to associate it with the position x(i). Similarly, if this assumption can be used, processing system 14 in sixth step 26 determines for each image line edge of the second polarity at position x(i) the associated lighting pattern edges L(i−1), L(i+1) of the adjacent image line edges of the first polarity at positions x(i−1), x(i+1). Processing system 14 then selects a lighting pattern edge L(i) of a transition in the current lighting pattern P(n) between lighting pattern edges L(i−1). L(i+1) associated with the image line edges of the first polarity at the adjacent positions x(i−1), x(i+1) and associates the selected lighting pattern edge L(i) with the position x(i) of the image line edge of the second polarity.

With some type of object and under some lighting conditions use of this type of assumption may lead to an increased probability of errors. In an embodiment the probability of such errors may be reduced by making use of the knowledge that only one correct image line edge of the second polarity can occur between each pair of image line edge of the first polarity that have been associated with lighting pattern edges by means of image line edges from the image IM(n−1) obtained with the previous lighting pattern P(n−1). Processing system 14 may be configured to select one edge of the second polarity if a plurality of image line edges of the second polarity occurs between a pair. Thus, compared to associating all image line edges with lighting pattern edges, the probability of a "false" association is reduced.

Processing system 14 may be configured to use any of a number of criteria to select one edge of the second type between image line edges of the first type. In an embodiment wherein the image is a difference image, with sign changes at the position of image line edges (obtained for example by taking the difference between image values obtained during illumination with a pattern and the complement of that pattern) the image line edge position can be selected by selecting a local extreme of the cumulative signal function (a maximum if the edge of the second type is a down going edge and a minimum if it is an up-going edge)

$$F(x) = \text{Sum } S(i)$$

where S(i) is the value of image IM(n) in the current image line and at a position along that line indexed by i and the sum is taken over index values up to the position x on that line. The signal S(x) may be a multi-bit signal (e.g. an 8-bit signal). The function F is an example of a function of detection score values that may be used to select one detected image line edge of the second type between image positions that are associated with lighting pattern edges of the second type.

Instead of this cumulative signal function, other criteria with effectively similar effect may be used. Use of a cumulative signal function effectively eliminates position detections based on image line edges where the sign of the signal changes from the original value but that are followed after a short interval by a return edge that in turn is followed by a longer interval where the signal along the image line has the original value (and more generally eliminating such image line edges+return image line edges if the fraction of line at the original value is longer). Small position errors may still arise if many such pairs lie near the correct edge of the second type, but such small position errors need not affect the final result. Of course a similar technique may be applied if a difference image is not used, for example by using a cumulative difference between the image signal and its average between the pair of image line edge of the first polarity that are associated with lighting pattern edges (this may also be used if a difference image is used). The position may be determined from a result of applying a filter operation to the signal segment between the pair image line edges of the first polarity that are associated with lighting pattern edges. As alternative criteria, other detection score may be used. For example the one edge of the second type may be selected based on edge amplitude as a detection score (for example by selecting the edge with the largest amplitude), or dependent on a score dependent on a distance to a nearest edge position x(i) of the second type that has been associated with a lighting pattern edge in an adjacent image line (for example by selecting the edge in the current image line closest to that edge position). A combination of such criteria may be used, for example by assigning scores to positions according to different criteria (cumulative signal value, amplitude, distance etc.), for each edge combining the scores according to the different criteria and selecting the edge with the best combined score.

In an embodiment processing system 14 may perform fifth step 25 by determining the closest edge from a plurality of images IM(n−1), IM(n−2) . . . . In this embodiment fifth step 25 comprises updating the positions x(i') associated with lighting pattern edges L=L(i') in preceding images IM(n−1), IM(n−2) . . . to the position x(i) associated with the same lighting pattern edge L=L(i) in the image IM(n) obtained with the current lighting pattern P(n).

Furthermore in this embodiment fifth step 25 comprises determining, for each image line edge position x(i) of the first polarity, the closest updated image line edge position x(i') from the images IM(n−1), IM(n−2) . . . obtained with any preceding lighting pattern P(n−1), P(n−2) and copying the associated lighting pattern edge L(i') of that closest image line edge. Various refinements of this procedure may be used. For example, processing system 14 may be configured to resort to a position from an older image IM(n') to copy an associated lighting pattern edge for a current image IM(n) (n'<n) only if no position x(i') within a predetermined distance d is available from a younger image IM(n") (n'<n"), i.e. if there is no position x(i') in the younger image IM(n") with |x(i)−x(i')|<d.

As another example, binary values (1 or 0) may be assigned to pixel positions along an image line in successive images IM(0), IM(1) . . . based on comparison of image values with a threshold. In this way, absent object motion, the binary values for the same position from N different images IM(0), IM(1) . . . IM(N−1) form an N-bit code that can be used as an index for the part of the illumination pattern that is visible at the position. Motion can be accounted for by moving the positions of edges in the signal formed by the binary values along the line each time according to the position that has been found for the edge with the same associated lighting pattern edge.

Although an embodiment has been described wherein fifth step 25, with the determination of edge positions of the first polarity is performed before sixth step 26 with the determination of edge positions of the second polarity, it should be noted that this sequence may be reversed. In this case, the image positions of edges of the first polarity determined for a preceding structured lighting pattern may be used to set the range in which the search for the image positions of edges of the second polarity are determined. In a further embodiment motion estimated for the edges of the first polarity determined for a preceding structured lighting pattern may be used to adjust the image positions before setting the range. The motion may be estimated from the image positions of corresponding edges from a series of preceding structured lighting patterns. Next the image positions of edges of the second polarity determined for the current structured lighting pattern may be used to set the range in which the search for the image positions of edges of the first polarity are determined. In this embodiment a similar cumulative sum algorithm as that of sixth step 26 may be used in fifth step 25, the starting position for computing the cumulative sum being determined from the positions of the selected positions of edges of the second polarity. This may increase the robustness against motion effects.

Processing system 14 may be configured to enforce monotonicity during the updates, e.g. to maintain a condition x(0)<x(1)<x(2)< . . . for each image. For example processing system 14 may be configured to update also the position x(i') of an edge in an older image IM(n') for which no corresponding position has been found in a younger image, if the update a lower position x(i'−1) moves that lower position past the position x(i'). The position x(i') may be shifted by the same amount as the position x(i'−1) for example, or to a predetermined offset from the position x(i'−1).

When processing system 14 determines in seventh step 27 that the preceding steps have been executed for a predetermined number of lighting patterns, processing system 14 proceeds to an eight step 28. In eight step 28, processing system 14 determines 3D coordinates of the object points that are visible at the edges in the lighting pattern, using the position x(i) and information about the 3D surface that corresponds to the edge with the associated lighting pattern edge L(i) associated with the position. Processing system 14 may use the fact that the position x(i) and the image line on which it was detected define a pixel position, which in turn defines a 3D line of points that may be imaged onto the pixel. Furthermore, processing system 14 may use the fact that a lighting pattern edge corresponds to a 3D surface formed by light rays from light source 10 that pass through the edge in the cross-section. Processing system 14 may solve the 3D coordinates of the object point, or the distance from the object point to the camera, by solving the point at the intersection of this 3D line and this 3S surface.

In an alternative embodiment, eight step 28, may comprise that processing system 14 controls light source to illuminate the object with a further lighting pattern P' and use the associated lighting pattern edges L(i) obtained by means of the images IM(n) to identify features in the further lighting pattern based on a predetermined spatial relation between the edges in the cross sections of the lighting patterns P(n) and the features in the further lighting pattern.

In an embodiment, processing system 14 is configured to determine at least one of the image line edge positions x(i) with sub-pixel accuracy by determining the positions where an interpolation of the image intensity between pixel positions, or a derived quantity of the image intensity, intersects a predetermined level. Thus, more reliable identifications of edges are made possible and 3D positions can be determined with high accuracy.

The process may be performed for a plurality of image lines of the images IM(n) independently for different ones of the image lines. In an embodiment associated lighting pattern edges of edges in adjacent lines may be used to associate lighting pattern edges to positions on an image line and if no edges are detected. In another embodiment edges may be detected using two dimensional image operators, for example from sums of pixel values for corresponding pixels in adjacent image lines.

As described a series of lighting patterns is used, wherein each successive lighting pattern P(n+1) has first intensity features, in particular edges (spatially changing light intensity), at positions that are equal to those of intensity features (edges) in the preceding lighting pattern P(n) plus second intensity features between the first lighting pattern edges.

In an embodiment, eight step 28 may be repeated using images obtained at different time points. Thus, one identification of the edges using the preceding steps may be applied to 3D positions determination at the plurality of time points. In an embodiment, motion tracking may be applied to compensate for motion of the edges due to object motion between different images to which eight step 28 is applied. In an embodiment a part of the series of structured lighting patterns may be projected onto the object before or after such repeated eight step 28, and used to identify image positions corresponding to edges of the first and second polarity, as described in the preceding. In a further embodiment this is done only for selected repetitions of eight step 28, for example when a test shows that the existing edge identifications may be missing or unreliable, for example when it is detected that the image positions determined for the same edge in different lines differ by more than a threshold value, temporal motion exceeds a threshold value, or if no edge can be found.

In this embodiment, successively preceding structured lighting pattern from the series may be projected in temporal succession, i.e. patterns with successively less edges. When in this case an image is obtained using a structured lighting pattern from the series, the previously determined, preferably motion compensated, image positions of edges in that pattern are used to set the search range for edges of the first and/or second polarity. If the search produces new image positions for all edges, these are used to determine the image positions for edges subsequent structured lighting patterns in the way described by means of the flow chart of FIG. 2, but applied to the newly projected structured lighting pattern from the series. Only if image positions are not determined for all edges, the next preceding structured lighting pattern for the series is projected and used to search for the image positions and so on. In this way, a most high frequency part of the structured lighting patterns from the series may be used to compensate for loss of accuracy during motion tracking. Although this option of re-illuminating with only part of the structured lighting patterns, for example to correct for loss of identification due to motion, has been described for use with repeated execution of eight step 28, it should be appreciated that is may also be applied before the first execution of eight step 28, for example by re-illuminating with one or more of the structured lighting patterns with less edges and re-identifying detected edges in the image, in response to detection that of an unreliable result, or a missing edge in fifth and sixth steps 25, 26.

While the invention has been illustrated and described in detail in the drawings and foregoing description, such illustration and description are to be considered illustrative or exemplary and not restrictive; the invention is not limited to the disclosed embodiments.

Although an embodiment has been described wherein edges in the lighting pattern are used, it should be appreciated that other localizable features may be used. For example lighting patterns with lines or wavelets of predetermined width in the cross-section may be used, the mid positions of the lines being used instead of the edge positions. However, this may make it more difficult to distinguish the first and second subset based on edge polarity.

Although preferably each feature in a lighting pattern has a counterpart at the same position in the next lighting pattern, it should be appreciated that this need not always be the case. Thus, features (e.g. outermost features) may be used to guide the selection of associated lighting pattern features for a limited number of subsequent lighting patterns, without being used up to the final lighting pattern.

Although the process has been described for light/image intensity features in general, it should be appreciated that the intensity of a color component or a combination of color components may be used. Light source 10 may be configured to illuminate the object with a light pattern of one color component, or a white light pattern, or a plurality of different patterns in different color components.

Although an embodiment has been described wherein features (edges) of the second subset are added between each pair of features of the first subset, it should be appreciated that the second subset may comprise fewer features. Thus, a lighting pattern P(n) may contain no additional feature between a pair of successive features that were already present in the preceding lighting pattern P(n−1). This has the effect that less new features can be associated lighting pattern feature and that distinctions must be made between the polarity of features in the first and a second set in different image areas. In another embodiment more than one feature of the second subset may be added between a pair of features of the first subset. This has the effect that more new features can be associated lighting pattern features and that distinctions must be made between first and second features with the same polarity.

Although an embodiment has been described wherein lighting patterns with successively more features are used, it should be appreciated that alternatively the lighting patterns may be used in reverse order. In this case processing system 14 may store the detected image line feature positions for the different images and perform the lighting pattern feature association steps starting from the image with the least features afterwards.

In another embodiment the lighting patterns P(n) may be used in any temporal order. However, the use of lighting patterns with a temporally increasing or decreasing number of features Although an embodiment has been described wherein the lighting patterns with the least features has one feature, it should be appreciated that alternatively the lighting patterns with the least features may have more than one feature. As long as the features are sufficiently spaced to allow for an initial identification of image line features (e.g. by counting features from the start of the image line) the process can be performed with such a lighting pattern as a starting point.

Although an embodiment has been described wherein the lighting patterns is essentially binary (on off) it should be appreciated that alternatively lighting patterns with more gradual intensity variation as a function of position may be used.

Although an embodiment has been described wherein the lighting patterns has features in flat planes of rays, it should be appreciated that alternatively features in curved surfaces may be used, that have curved intersections with object 16 even if object 10 is flat. Given a description of the 3D shape of the surface, processing system 14 can determine the 3D positions by solving the intersection of the ray from the camera and the 3D shape of the surface. Nor need the surfaces with features in the lighting pattern be parallel to each other, but it is preferred that they do not intersect each other within the range defined by the camera view angle.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining 3D surface position information from an object using structured lighting, the method comprises:
providing a series of successive structured lighting patterns, each successive structured lighting pattern in the series comprising a first subset and a second subset of intensity features, each intensity feature of the first subset coinciding spatially with a respective one of the intensity features from either the first subset or the second subset from a preceding one of the successive structured lighting pattern in the series;
illuminating the object with different ones of the successive structured lighting patterns of said series each at least at a different time point;
capturing 2D images of the object, each when the object is illuminated with a respective one of the successive structured lighting patterns;
detecting image positions within the 2D images where the intensity features of the first and second subset of the successive structured lighting patterns are visible in the 2D images;
for each particular one of the successive structured lighting patterns in the series:
storing labels of the intensity features of the first subset of the particular one of the successive structured lighting patterns in combination with image positions within the 2D image captured using the particular one of the successive structured lighting patterns where the intensity features of the first subset are visible based on previously stored intensity feature label and image position combinations previously determined using a preceding one of the successive structured lighting patterns in said series and the 2D image captured using the preceding one of the successive structured lighting patterns in said series, and
associating intensity features of the second subset with image positions where the intensity features of the second subset are visible, in respective position ranges between pairs of the image positions associated with mutually adjacent intensity features of the first subset, the association being based on the associations of the mutually adjacent intensity features;
using the associations between intensity features and image positions in a final one of the successive structured lighting patterns of the series to identify the intensity features of the final one of the successive structured lighting patterns for the determination of 3D surface position information.

2. A method according to claim 1, wherein the object is illuminated with the successive structured lighting patterns in a temporal sequence corresponding to their sequence in the series.

3. A method according to claim 1, wherein the intensity features are edges between areas of mutually different light intensity in the successive structured lighting patterns.

4. A method according to claim 3, wherein the intensity features of the first and second subset are edges in mutually opposite directions of intensity change along an image line.

5. A method according to claim 1, wherein the method comprising selecting one image position where an intensity features of the second subset is visible between the image positions of one of the pairs, if a plurality of intensity features of the second subset is detected between the image positions of said one of the pairs, and associating the selected image position with the intensity features of the second subset between the intensity features associated with said one of the pairs of positions.

6. A method according to claim 1, comprising:
assigning feature detection score values for detection of intensity features of the second subset to respective image positions,
selecting one intermediate image position for each of said pair of image positions, based on the assigned detection score values of a range of image positions between the image positions of the pair, and
associating the selected image position with the intensity features of the second subset between the intensity features associated with the pair of positions.

7. A method according to claim 1, wherein for each successive structured lighting pattern the associating of the intensity features of the first subset with detected image positions is based on the intensity feature and image position association information determined using spatially closest detected image positions from 2D images captured using either an immediately preceding successive structured lighting pattern of the series or a further preceding successive structured lighting in the series.

8. A method according to claim 1, comprising for a current successive structured lighting pattern in said series:
- first associating image positions where the intensity features of the second subset are visible, between pairs of the image positions associated with intensity features of the first subset in the image obtained with a preceding successive structured lighting pattern in said series, with intensity features of the second subset between the intensity features associated with the pair of positions in the image obtained with the current structured lighting pattern in said series;
- defining a search range between the image positions associated with successive intensity features of the second subset in the image obtained with the current successive structured lighting pattern in said series;
- subsequently searching the search range for the image position where the intensity feature of the first subset is visible and associating that image position with the associated intensity features in the image obtained with the current successive structured lighting pattern in said series.

9. A method according to claim 1, comprising
additionally repeating illumination of the object with one or more successive structured lighting patterns from only a part of the series when the association between image positions and the intensity features of at least one of the first and second subset has been lost,
capturing one or more further 2D images of the scene, each when the scene is illuminated with a respective one of said part of the successive structured lighting patterns; and
re-associating intensity features with image positions where the intensity features of the first subset are visible in the one or more further images.

10. A method according to claim 1, comprising using the detected positions of the identified intensity features in the final structured lighting pattern of the series to determine 3D surface position information of object positions where the intensity features of the final successive structured lighting pattern intersect the object.

11. A method according to claim 1, comprising
illuminating the object with a further structured lighting pattern that has a predetermined spatial relation to said final successive structured lighting pattern;
capturing a further image while the object is illuminated with the further structured lighting pattern at a time closer to a time of illumination of the object with the final successive structured lighting pattern than a time of illumination of the object with an initial successive structured lighting pattern in the series;
using the associated intensity features of positions obtained with the intensity features of the final successive structured lighting pattern and the predetermined spatial relation to identify detected intensity features in the further image;
using the detected positions of the identified intensity features obtained with the further structured lighting pattern to determine 3D surface position information of object positions where the intensity features of the further structured lighting pattern intersect the object.

12. A method according to claim 1 wherein the image positions are detected from image intensity variations along an image line.

13. A computer program product, comprising a non-transitory medium storing a program of instructions for a programmable computer system that, when executed by the programmable computer system will make the programmable computer system perform the capturing, detecting and associating steps according to claim 1.

14. A 3D object scanner for determining 3D position information of an object using a series of successive structured lighting patterns, each successive structured lighting pattern in the series comprising a first subset and a second subset of intensity features, each intensity feature of the first subset coinciding spatially with a respective one of the intensity features from either the first subset or the second subset from a previous successive structured lighting pattern in the series, the 3D object scanner comprising a light source configured to project structured light, a camera and a processing system coupled to the light source and the camera, the processing system being configured to:
- capture 2D images of the object, each when the object is illuminated with a respective one of the successive structured lighting patterns at different time points;
- detect image positions within the 2D images where intersections of the object with the first and second intensity features of the successive structured lighting patterns are visible in the images;
- for each particular one of the successive structured lighting patterns,
- store labels of the intensity features of the particular one of the successive structured lighting patterns of the first subset in combination with image positions within the 2D image captured using the particular one of the successive structured lighting patterns where the intensity features of the first subset are visible based on previously stored intensity feature label and image position combinations previously determined using a preceding one of the successive structured lighting patterns in said series and the 2D image captured using the preceding one of the successive structured lighting patterns in said series, and
- associate intensity features of the second subset with image positions where the intensity features of the second subset are visible, in position respective ranges between pairs of the image positions associated with mutually adjacent intensity features of the first subset, the association being based on the associations of the mutually adjacent intensity features;
- use the labels of the intensity features in a final one of the successive structured lighting patterns of the series to identify the intensity features of the final one of the successive structured lighting patterns for the determination of 3D surface position information.

* * * * *